Nov. 2, 1965 W. A. ALEXANDER ETAL 3,215,824

ELECTRONIC CIRCUIT FOR ARITHMETIC OPERATIONS

Filed Dec. 26, 1961 3 Sheets-Sheet 1

WARREN A. ALEXANDER
ED R. McCARTER INVENTORS

BY John D. Gassett
ATTORNEY

ELECTRONIC CIRCUIT FOR ARITHMETIC OPERATIONS

Filed Dec. 26, 1961 3 Sheets-Sheet 2

WARREN A. ALEXANDER
ED R. McCARTER INVENTORS

BY John D. Gassett
ATTORNEY

ELECTRONIC CIRCUIT FOR ARITHMETIC OPERATIONS

WARREN A. ALEXANDER
ED R. McCARTER INVENTORS

BY John D. Gassett
ATTORNEY 3,215,824
Patented Nov. 2, 1965

3,215,824

ELECTRONIC CIRCUIT FOR ARITHMETIC OPERATIONS

Warren A. Alexander and Ed R. McCarter, both of Tulsa, Okla., assignors, by mesne assignments, to Esso Products Research Company, Houston, Tex., a corporation of Delaware Filed Dec. 26, 1961, Ser. No. 161,781
8 Claims. (Cl. 235—193)

This invention relates to electronic analog calculators. It relates more particularly to a system for carrying out the arithmetic operations of multiplication, divisions, the obtaining of roots, squaring and combinations of these.

In conventional analog calculators it is customarily the practice to use motor-operated potentiometers in carrying out the arithmetic operations of multiplication, divisions, square rooting, squaring, and combinations of these. These include servo-multipliers, Wheatstone bridge multiplier and the like. Their proper operations depend upon proper physical positioning or operations of the potentiometer, i.e. a mechanical-like operation. These analog computers have been very helpful in the progress of industry. However, they do have certain disadvantages. More specifically, the mechanical parts affect their reliability and their speed of operation. Further, there is a certain amount of maintenance of such mechanical parts.

This invention discloses an electronic computer in which no mechanical parts are necessary in the calculator. Thus, the absence of mechanical parts in the computer results in more reliability, greater speed, and reduced maintenance of the computer.

In the practice of this invention applicants use an amplifier means having an AGC (automatic gain control) amplifier loop for arithmetical operation of a first signal and a second signal. The AGC amplifier loop is non-responsive to the frequencies of the two signals. The amplifier loop contains a "losser" element. By "losser" element is meant an element whose resistance can be varied depending upon some electrical source. A carrier signal having frequencies removed from the frequencies of either of the two signals is amplitude modulated by one of the signals to obtain an amplitude modulated signal. The amplifier AGC loop is selected to be responsive to the frequencies of the carrier signal which is amplitude modulated. The amplitude modulated signal, representative of one of the signals, is used for example to control the "losser" element. The other analog signal is acted upon by the amplifier; however, the manner or extent to which the amplifier acts on the other signal is controlled by the losser element which is controlled by the first analog signal. Thus an electrical signal operates the losser element directly. The losser element being an electronic component is capable of very high speed operation, as well as low speed operation. This gives great speed of operation and high reliability.

Various objects of the invention and a complete understanding thereof may be had from the following description taken in conjunction with the drawing in which.

Figure 1:
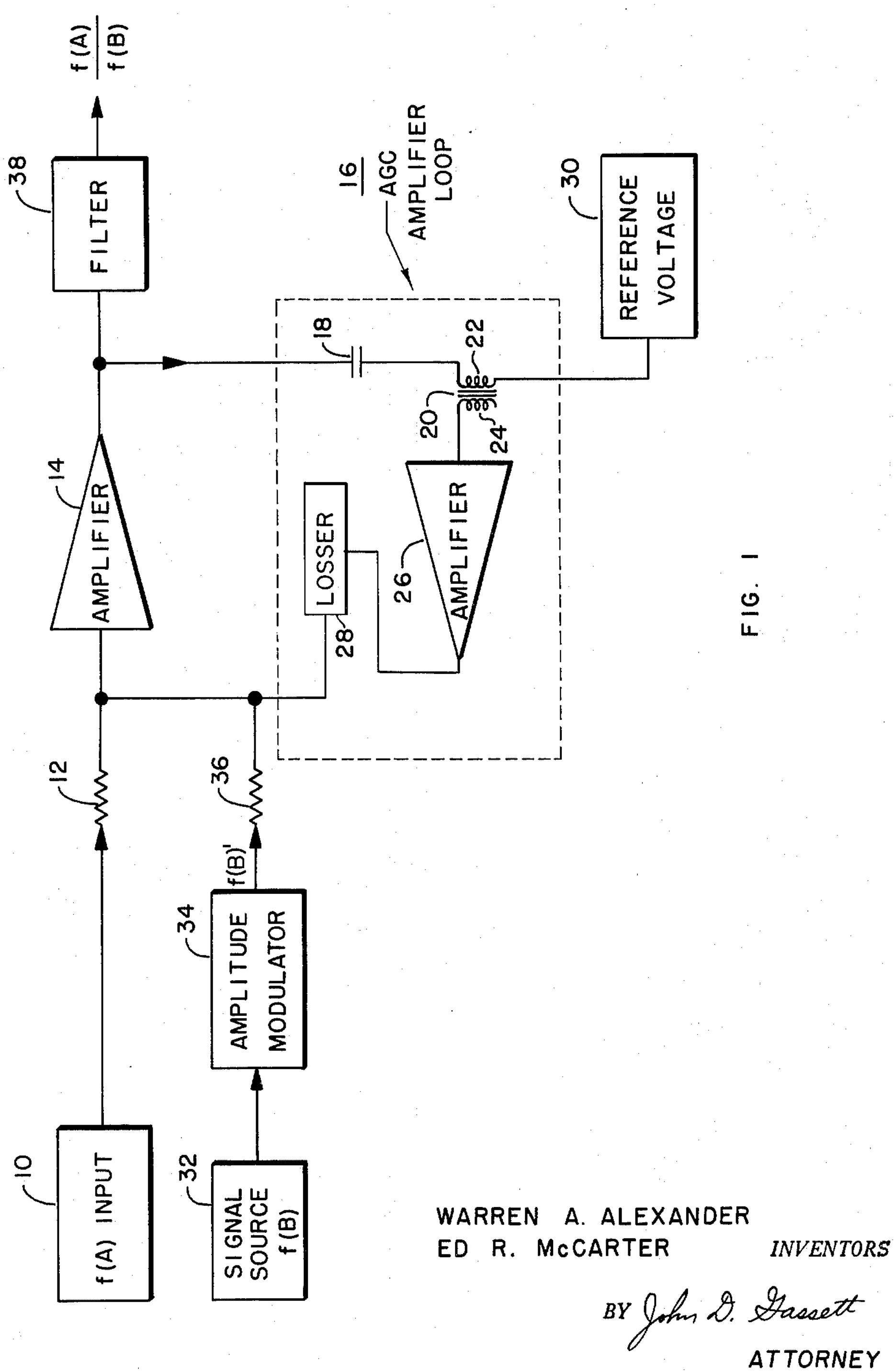
FIG. 1 illustrates a preferred embodiment of an analog system for performing a divisional operation.
Figure 2:
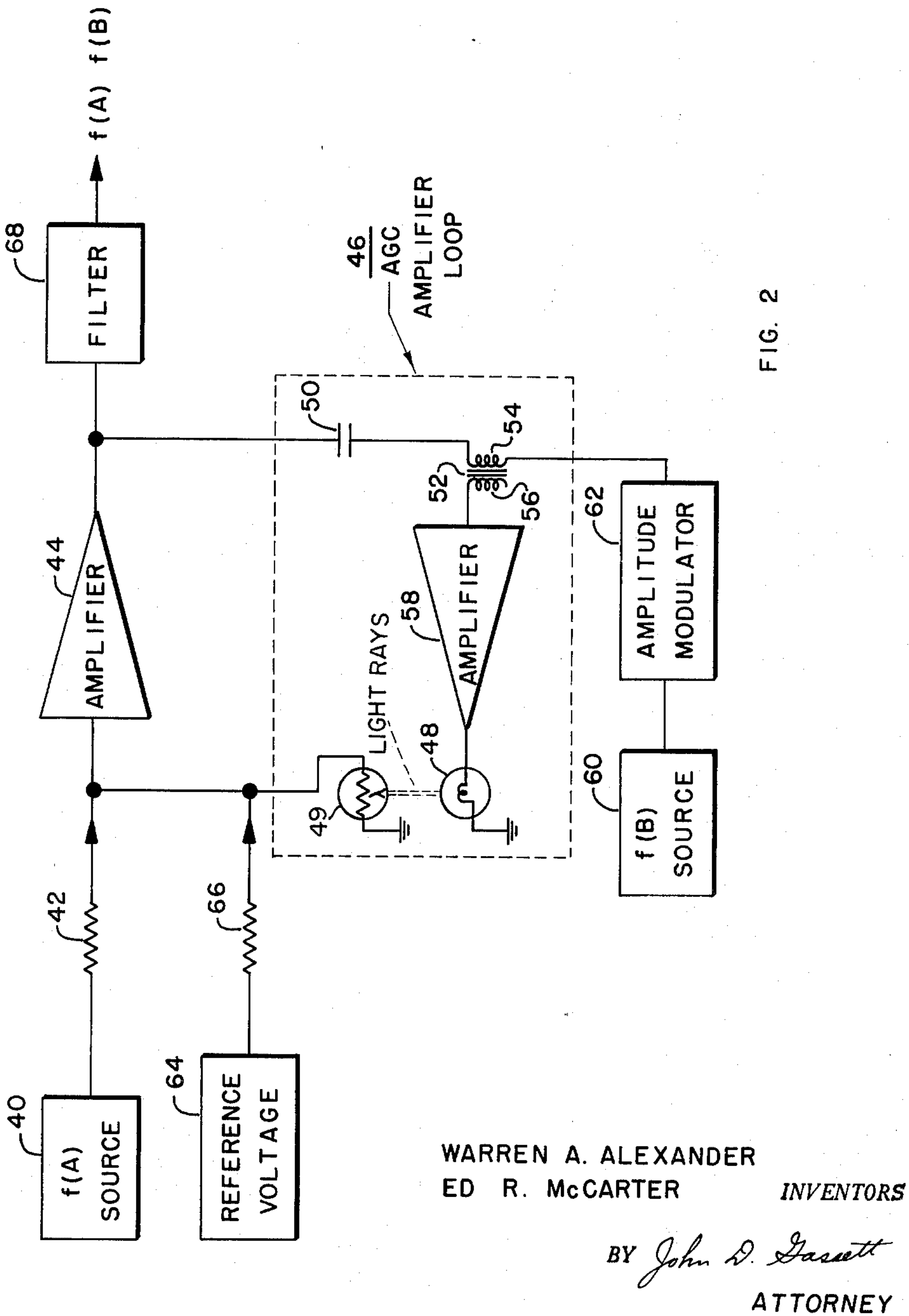
FIG. 2 illustrates a preferred embodiment of an analog system for performing a multiplying operation; and, FIG. 3 illustrates a preferred embodiment especially adapted for obtaining a square root.
Figure 3:
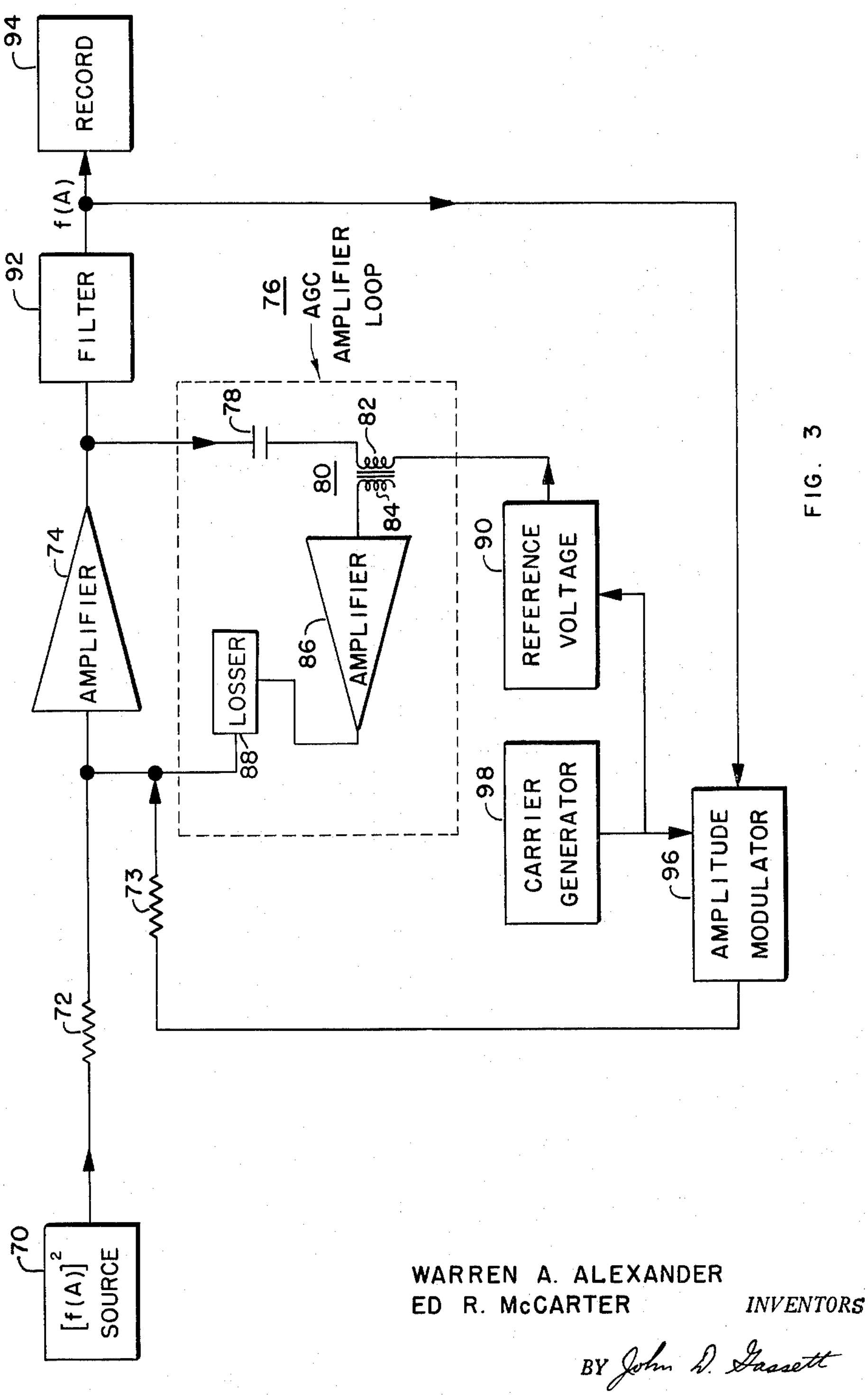

Reference is made to the drawing and to FIG. 1 in particular which illustrates a preferred form for use in the analog division of one signal $f(A)$ by another signal $f(B)$. Illustrated thereon is the $f(A)$ input signal source 10. The signal source $f(A)$ may be a reproduction from a recording such as magnetic tape or it may be taken directly from the variable being measured. The output signal $f(A)$ from source 10 is fed through a fixed resistance 12 to a linear gain amplifier 14. An AGC (automatic gain control) amplifier loop 16 is provided for amplifier 14. The automatic gain control amplifier loop shown illustrates a capacitor 18 connected to a transformer 20 having a primary winding 22 and a secondary winding 24. The secondary winding 24 is connected to amplifier 26. The output of amplifier 26 is used to control a variable resistance or "losser" element 28. The losser element can, for example, be a pair of balanced diodes or balanced vacuum tubes or it can be a photo-resistive element. The control of the amount of input signal fed to amplifier 14, that is the amount of amplification of $f(A)$ is accomplished by the feed-back action of the AGC loop by controlling the loss introduced by the losser element in the simple voltage divider circuit made up by resistor 12 and the losser element. A reference voltage from source 30 is applied to one terminal of winding 22. AGC amplifier loops are known in the geophysical art, one such suitable device being described in U.S. Patent No. 2,726,290 which shows one such loop being shown in FIG. 4. FIGS. 1, 2, and 3 of that patent illustrate losser elements using vacuum tubes. The AGC amplifier loop in its normal operation functions to maintain essentially a zero voltage differential across primary winding 22. The average rectified amplitude of the output of amplifier 14 is then relatively constant.

Signal source 32, which can be a magnetic recording of the signal $f(B)$ or it can be the direct measurement of that function, is connected to an amplitude modulator 34. Amplitude modulator 34 is of a character to have an output frequency which should be at least 2 times and preferably 4 or 5 times the greatest frequency in either $f(B)$ or the signal $f(A)$. Amplitude modulator 34 can take on various forms, one such form being a "chopper." A suitable "chopper" is a Brown Converter, commercially available from Minneapolis Honeywell, Minneapolis, Minnesota and is described in their specification S–900–2. The output of amplitude modulator 34 is fed through a fixed resistor 36 to the common connection between losser 28 and amplifier 14.

The reference voltage from source 30 has the same frequency as the output of amplitude modulator 34 and is in phase therewith. AGC loop 16 is also selected or designed such that losser 28 is responsive to the carrier frequency as put out by the amplitude modulator 34, but is non-responsive to the frequencies of the signals of either $f(A)$ or $f(B)$. Means of providing this frequency response is well known. For example, this can be accomplished by the proper selection of capacitor 18 and transformer 20. The output of amplifier 14 is also fed to filter 38. Filter 38 is of a character to be responsive to the frequencies of $f(A)$ and $f(B)$ but non-responsive to or blocks the frequencies of the reference voltage and the voltage and the frequency of the output of amplitude modulator 34.

The operation of the apparatus in FIG. 1 as a divider will now be discussed. It will be assumed that it is desired to obtain the quotient for $f(A)$ and $f(B)$. It will further be assumed that the frequency components of $f(A)$ and $f(B)$ are known and the maximum frequency thereof is 50 c.p.s. With this information the frequency response of the AGC amplifier loop and the amplitude modulator 34 and reference voltage source 30 is then determined. The frequency response of the output of amplitude modulator 34 should be at least 100 and is preferably around 200 c.p.s. As stated above, the AGC amplifier loop is then selected to be responsive to 200 c.p.s. The frequency of the reference voltage source 30 is likewise selected to be 200 c.p.s. The output voltage of reference voltage 30 has a constant amplitude level.

AGC amplifier loop 16 is designed such that it is nonresponsive to the frequencies of the signal $f(A)$. Therefore, signal $f(A)$ has no effect upon the amplifier loop. Signal $f(B)$ controls the amplitude of the modulated signal $f(B)'$ from modulator 34. This modulated signal $f(B)'$ is passed via resistor 36, amplifier 14, condenser 18, and transformer 20 to automatic gain control amplifier 26 and thus sets the degree of loss or attenuation introduced into the loop by losser element 28. Thus losser element 28 is controlled by the signal $f(B)$ which has been amplitude modulated. Losser element 28 in conjunction with the fixed resistor 12 controls the fractional part of $f(A)$ which is applied to amplifier 14. The amplification of $f(A)$ through amplifier 14 then is directly controlled by the signal $f(B)$. As the signal $f(B)$ increases, the amplification of $f(A)$ decreases. Amplifier 14, it will be remembered, is of a character to amplify both the frequency $f(A)$ and $f(B)$; however, only the signal $f(B)$ controls losser element 28 which controls the amplitude of the signal to amplifier 14. Filter 38 permits only the passage of the frequencies of $f(A)$ and $f(B)$, thus the output of filter 38 is the quotient of $f(A)$ divided by $f(B)$.

As a further aid in explaining the operation of the device of FIG. 1, let numerical examples be assumed. If $f(A)$ is taken as unity and for initial consideration $f(B)$ is also unity, the difference between the output signal $f(B)'$ from amplitude modulator 34 (which has been modified in amplitude by losser element 28 and amplifier 14) and the reference voltage appears across the primary winding of 22, and the AGC loop reacts so that a static condition is reached such that there is zero difference. At this time the output of filter 38 is of a value representative of unity. If $f(B)$ increases from one to two, it is known that the answer should be one over two or ½. Now the quantity $f(B)'$, which is representative of two, passes through resistor 36, amplifier 14, and through the coupling component 18 to one side of winding 22. Now since $f(B)$ is greater than the reference voltage, there is a signal across the transformer which is coupled to the amplifier 26 and acts upon losser element 28. It acts upon this losser element 28 in such a fashion and in such a magnitude as to cause a voltage difference across element 22 to become zero. As the voltage of $f(B)'$ is greater than the reference voltage, the feed-back to the losser element 28 is such that the signal is cut down proportionally until there is zero differential across winding 22. As only the modulated signal $f(B)'$ is operative to control losser element 28, it is thus seen that the level of the signal is controlled directly by $f(B)$. As $f(B)$ has increased by a ratio of 2, the signal to amplifier 14 will be decreased by a factor of 2. The output of filter 38 then is $f(A)/f(B)$ and is a value ½ of the value of unity. It is thus seen that $f(A)$ passes through the voltage divider of resistance 12 and losser 28, and the level is controlled by the loss introduced by element 28. The amplitude level of $f(A)$, as well as upon $f(B)$, is dependent upon losser element 28 which is controlled by the signal $f(B)'$, i.e., after $f(B)$ is amplitude modulated so that AGC amplifier loop 16 is responsive to it. By proper scaling it is thus apparent that the output of 38 can be operative to give a numerical reading.

Reference is now made to FIG. 2 which illustrates an embodiment for multiplying $f(A)$ by $f(B)$. Signal $f(A)$ source 40, resistor 42, amplifier 44 and its associated AGC amplifier loop 46 are quite similar to the corresponding elements 10, 12, and 14 of FIG. 1. It will be noted, however, that in AGC amplifier loop 46, the losser element includes lamp 48 and photo-resistive type transducer 49 as a specific form of the variable resistance 28 of FIG. 1. AGC amplifier loop 46 includes capacitor 50, transformer 52 having a primary coil 54 and a secondary coil 56, and amplifier 58. The $f(B)$ source 60 is electrically connected to amplitude modulator 62. The output of amplitude modulator 62 is connected to primary winding 54 of transformer 52 of the AGC amplifier loop. The nature of the AGC loop is that the loop or circuit responds to the frequency of the output of amplitude modulator 62.

Amplitude modulator 62 is of a character to have a frequency which is preferably four or five times that of either $f(A)$ or $f(B)$. This amplitude modulated signal is then fed to primary winding 54 of the AGC amplifier loop. A reference voltage source 64 is connected through resistor 66 to the input of amplifier 44. Reference voltage source 64 and amplitude modulator 62 are arranged to have the same output frequency and to be in phase. This is easily accomplished as, for example, having the same frequency source control the reference voltage source 64 and the amplitude modulator 62. A suitable type reference voltage source is commercially available from General Radio Co., West Concord, Mass., and is designated Type 1302–A Oscillator.

The output of amplifier 44 is also connected to filter 68. Filter 68 is of a character to reject the carrier frequencies. That is, the carrier frequencies of reference voltage source 64. Thus filter 68 passes the product of the signals $f(A)$ and $f(B)$.

A brief description of the operation of the circuit of FIG. 2 will now be given for the multiplication of $f(A)$ times $f(B)$. The frequency of amplitude modulators 62 and the reference voltage source 64 are selected to be at least two and preferably four or five times the frequency of $f(A)$ or $f(B)$. The AGC amplifier loop 46 is selected to be responsive to the selected frequency of amplitude modulator 62 and non-responsive to the frequency of $f(A)$. This can be done in a conventional manner such as by the proper selection of capacitor 50 and a selection of transformer 52 as well as other selective filters in the amplifier portion.

The reference voltage source 64 is activated and the source of $f(A)$ and $f(B)$ are simultaneously initiated. The relatively high frequency of the reference voltage will pass though amplifier 44 and through the AGC amplifier loop 46. Simultaneously the amplitude modulated signal is fed to one end of winding 54. In this case the AGC loop acts to control losser element 48 so that the voltage drop across primary winding 54 is zero. In other words the losser element 48 operates to make the voltage appearing at the upper terminal of transformer 52 the same as the amplitude of $f(B)$. It is then seen that $f(B)$ controls the losser element 48. As is known, the operation of the losser element in an AGC loop controls the amplitude of the signal output from amplifier 44. The signal $f(B)$ passing through amplifier 58 to element 48 controls the resistance of element 49. The voltage divider made up of resistor 42 and element 49 controls the fraction (proportional amount) of the signal $f(A)$, which is applied to the input of amplifier 44. Therefore, the signal $f(B)$ directly controls the amplification of amplifier 44. Manifestly, the amplication of the output component from amplifier 44 of signal $f(A)$ is a direct function of signal $f(B)$. Therefore, the signal $f(A)$ is multiplied by the signal $f(B)$ so that the output of amplifier 44 is indicative of the product of the two signals. The output of amplifier 44 is fed to filter 68 which permits the passage of those frequencies representing the product of $f(A)$ and $f(B)$. The output of filter 68 then is seen to be the product of $f(A)$ times $f(B)$.

Reference is now made to FIG. 3 which illustrates an embodiment for obtaining the square root of $[f(A)]^2$. The signal from the signal source 70 is fed through resistor 72 to amplifier 74. Amplifier 74 has an AGC loop 76 similarly as loop 16 of FIG. 1.

AGC loop 76 includes capacitor 78 and transformer 80 having primary winding 82 and secondary winding 84. The AGC loop also includes amplifier 86 and adjustable losser element 88. A reference voltage is supplied from reference voltage source 90 to primary winding 82. Reference voltage source 90 is of a character to have an output frequency which is selected to be at least two times the highest frequency of $[f(A)]^2$. It is also to be noted that AGC loop 76 is designed so that it is responsive to the frequency of reference voltage 90 but is non-responsive to the frequency of the signal $[f(A)]^2$.

The output from amplifier 74 is also fed to filter 92. Filter 92 is selected to pass the frequencies encountered in the signal $[f(A)]^2$ but rejects the frequency of reference voltage source 90. The output of filter 92 is fed to recording means 94. The output of filter 92 is also fed to amplitude modulator 96 which is similar to the amplitude modulator 34 of FIG. 1. Amplitude modulator 96 has an output frequency which is the same as the frequency of the reference voltage from reference source 90 and in phase therewith. This is readily accomplished by having carrier generator 98 control both amplitude modulator 96 and reference voltage source 90.

A brief description will now be given of the nature of the operation of the apparatus in FIG. 3 for obtaining the square root of a signal. For purposes of illustration it will be assumed that $[f(A)]^2$ has a maximum frequency of 50 c.p.s. and a typical voltage of 25 volts. The reference voltage source 90 will be selected such that it will have a frequency at least twice and preferably four or five times the frequency of $[f(A)]^2$. Thus the reference voltage should preferably have a frequency of about 200 c.p.s. Thus the network of the AGC loop 76 is arranged to be responsive to 200 c.p.s. but non-responsive to a frequency of 50 c.p.s. which is the maximum frequency of the signal upon which the square root operation is to be conducted. The value of the voltage of the reference voltage 90 is not critical; however, it is preferred that the reference voltage represents unity as this simplifies arithmetical scaling. However, this is not essential. Losser element 88 is designed in relation to amplifier 74 such that it can divide the voltage as fed thereto through resistor 72 as will be explained in the following description. The gain of amplifier 74 can readily be selected by one skilled in the art. However, it will be understood that the gain of amplifier 74 will not affect the scaling of the output of filter 92 as recorded on record means 94. Amplitude modulator 96 will be selected to have an output signal whose frequency is the same as the frequency of the output signal of reference voltage 90.

In further consideration of the operation of the circuit of FIG. 3, it will be assumed that when the device is first started that $[f(A)]^2$ has a value represented as 16. The output of filter 92 will, for an instant, be 16 also. That is, before the AGC loop has had time to operate. It will further be assumed that the reference voltage source 90 has an output voltage of 1. The output from filter 92 which has an instantaneous value of 16 is fed through amplitude modulator 96 so as to control losser element 88. AGC loop 76 reacts to reduce the voltage across primary winding 82 to zero. The control of the input signal, from source 70, is affected by the feed-back action of the AGC loop with the loss (or gain) being controlled by the voltage divider circuit made up of resistor 73 and losser element 88. The AGC loop then puts in a loss until the voltage at the upper end of winding 82 is 1. Thus the effective size of the input signal $[f(A)]^2$ to amplifier 74 is cut back. As the signal to amplifier 74 is cut back, the value of output of filter 92 is thus decreased. Thus the modulated signal $f(A)$ from amplitude modulator 96 is likewise decreased. This continues until the loss from losser element 88 is essentially the same as the output of filter 92 at which time the voltage drop across primary winding 82 is zero. Thus in effect the device of FIG. 3 is similar to the dividing element of FIG. 1 in that the signal from source 70 is divided by the signal from amplitude modulator 96. As the output from amplitude modulator 96 controls the losser element 88, the loss 88 goes to equilibrium and that is, the effective value of the loss introduced by losser element 88 becomes the same as the output of filter 92. Thus as the output of filter 92 is equal to the value of the loss imparted by losser element 88 (which acts as a divider of the signal applied to amplifier 74), the output from filter 92 is the square root of the signal from the output of source 70. With $[f(A)]^2$ taken with a value of 16, this action becomes stable when the output of filter 92 is the value 4; this can be attained when a loss of 4 is introduced by losser element 88.

It will be understood that the apparatus and system contained in the above description are merely representative or illustrative and are not limited and that numerous modifications may be made thereon without departing from the scope of the invention.

What is claimed is:

1. An electronic calculator for multiplying first and second electrical signals which comprises:

an alternating current amplifier having an input terminal and an output terminal;

a gain control circuit having variable resistance means connected to the input of said amplifier and first and second control voltage terminal means, the output of said amplifier being connected to said first control voltage terminal means, said gain control circuit being operative to vary the variable resistance thereof to control the gain of said amplifier to equalize the voltage between said first and second control voltage terminal means;

first circuit means having input terminal means and an output signal of a selected frequency which is amplitude modulated by an input signal applied at its input terminal means, and including means to connect its input terminal means to the second signal;

means connecting the output of said first circuit means to said second input terminal means of the gain control circuit;

means for connecting the first signal to said input terminal of said amplifier;

a reference voltage source having a frequency equal to the frequency of the output signal of said first circuit means; and means connecting said reference voltage source to the input terminal of said amplifier.

2. An electronic calculator for obtaining the square root of an input signal which comprises:

an amplifier having an input terminal and an output terminal;

a gain control circuit having variable resistance means connected to the input of said amplifier and first and second control voltage terminal means, the output of said amplifier being connected to said first control voltage terminal means, said gain control circuit being operative to vary the variable resistance means to vary the gain of said amplifier to equalize the voltage between said first and second control voltage terminals;

a filter connected to the output terminal of said amplifier and being responsive to pass therethrough a frequency in the range of the frequency of the input signal;
first circuit means having an output signal of a frequency at least two times greater than the frequency passed by said filter, the output signal of said first circuit means being modulated in amplitude by the output signal of said filter;
means connecting the output of said first circuit means to the input of said amplifier;
a reference voltage source having an output signal of the same frequency of said first circuit means; and
means connecting the output of said reference voltage source to said second control voltage terminal means.

3. An electronic calculator defined in claim 2 in which a carrier generator is provided to control the frequency of the output signal of said first circuit means and said reference voltage source so that signals from said reference voltage source and said first circuit means are of the same frequency and are in phase.

4. An electronic calculator for arithmetic operations on first and second electrical signals which comprises:
an alternating current signal amplifier having an input terminal and an output terminal;
a gain control circuit connected to the input and to the output of said amplifier, said gain control circuit including variable resistance means to regulate the output signals of said amplifier, said gain control circuit being controlled by signals of a frequency different from the frequencies of said first signal and said second signal to vary the resistance of said variable resistance means;
means for electrically connecting the first signal to the input of said amplifier;
modulating means for producing an amplitude modulated signal whose frequency is the frequency to which said gain control circuit is responsive, the amplitude of said amplitude modulated signal being modulated by said second signal;
a reference voltage source for producing a signal having the frequency to which said gain control circuit is responsive;
a selected one of said modulating means and said reference voltage source being connected to the input of said amplifier and the other being connected to the input of said gain control circuit, said gain control circuit being further adapted to regulate the output signals of said amplifier to equalize the signals applied to the input of said gain control circuit.

5. An electronic calculator for arithmetic operations on first and second signals which comprises:
an alternating current signal amplifier having an input terminal and an output terminal;
a gain control circuit connected between the input and output of said amplifier and including variable resistance means for varying the gain of said amplifier, said gain control circuit being adapted to vary said variable resistance means to regulate the output signals of said amplifier, said gain control circuit being responsive to input signals applied thereto of different frequency from said first and second signals to regulate the resistance of said variable resistance means;
a reference voltage source connected to the input of said gain control circuit;
said control circuit being further adapted to equalize input signals applied thereto by regulating the output signals of said amplifier;
means for connecting the first signal to the input of said amplifier;
first circuit means including means for connection to the second signal, said first circuit means having carrier signals of the frequency to which said gain control circuit is responsive for amplitude modulation by the second signal; and means connecting the output of said first circuit means to the input of said amplifier.

6. An electronic calculator for operations on first and second electrical signals which comprise:
an alternating current amplifier having an input terminal and an output terminal;
gain control circuit means including variable resistance means, connected between the input and output of said amplifier for regulating the output signals of said amplifier responsive to signals of selected frequency different from any frequencies of said first and second signals, said variable resistance means being connected to the input of said amplifier to control the gain of said amplifier to equalize the amplitude of signals connected to the input of said gain control circuit means;
means for connecting the first signal to the input of said amplifier;
first circuit means having an output signal of said selected frequency;
means for connecting the second signal to said first circuit means so that the output signal of said first circuit means is amplitude modulated by the second signal;
a reference voltage source having an output signal of said selected frequency in phase with the output of said first circuit means;
means connecting the reference voltage source to the input of said gain control circuit means; and
means connecting the output of said first circuit means to the input of said amplifier.

7. An electronic calculator for dividing a first electrical signal and a second electrical signal which comprises:
an alternating current amplifier having an input terminal and an output terminal;
a gain control circuit means including variable resistance means, connected between the input and output of said amplifier for regulating the output signals of said amplifier responsive to signals of selected frequency different from any frequencies of said first and second signals, said variable resistance means being connected to the input of said amplifier to control the gain of the amplifier to equalize the amplitude of signals connected to the input of said gain control circuit means;
signal generator means for producing a signal having said selected frequency;
modulating means to modulate the amplitude of the signal produced by said signal generator means by the second signal to obtain an amplitude modulated output signal;
means connecting the amplitude modulated signal to the input of said amplifier;
means for connecting the first signal to the input of said amplifier;
a reference voltage source for producing a reference voltage of frequency equal to said selected frequency; and
means connecting the reference voltage source to the input of said gain control circuit means.

8. An electronic calculator for multiplying a first electrical signal and a second electrical signal comprising:
a first amplifier having an input terminal and an output terminal;
a gain control circuit connected between the input and output of said amplifier;
said gain control circuit including variable resistance means connected to the input of said amplifier for varying the gain thereof, a second amplifier and a transformer in tandem;
said transformer having a primary winding and a secondary winding;
said gain control circuit being responsive to a signal of selected frequency different from the frequencies of the first and second signals to equalize the amplitude of signals applied to the primary winding of said transformer by varying the resistance of said variable resistance means;

a reference voltage source connected to the primary winding of said transformer;

means for connecting the first signal to the input of said first amplifier;

generating means to obtain a signal having said selected frequency, the amplitude of which is modulated in accordance with the second signal; and means connecting the output of said generating means to the input of said amplifier.

References Cited by the Examiner

UNITED STATES PATENTS

| | | | |
|---|---|---|---|
| 2,624,505 | 1/53 | Wing | 235—193 |
| 3,030,022 | 4/62 | Gittleman | 235—195 |

OTHER REFERENCES

Dickenson, Analog Multiplication and Division Circuit, IBM Technical Disclosure Bulletin, published March 1961, vol 3, No.10.

MALCOLM A. MORRISON, *Primary Examiner.*